(12) United States Patent
Yu et al.

(10) Patent No.: US 12,277,861 B2
(45) Date of Patent: Apr. 15, 2025

(54) SMART NOTIFICATIONS FOR VEHICLE PARKING GARAGE MANEUVERS

(71) Applicant: GM Global Technology Operations LLC, Detroit, MI (US)

(72) Inventors: Bo Yu, Troy, MI (US); Brent Navin Roger Bacchus, Sterling Heights, MI (US); Jiabin Shen, Burnaby (CA); Yuan Zhang, Shanghai (CN); Wenyuan Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 290 days.

(21) Appl. No.: 18/189,414

(22) Filed: Mar. 24, 2023

(65) Prior Publication Data

US 2024/0321106 A1 Sep. 26, 2024

(30) Foreign Application Priority Data

Mar. 20, 2023 (CN) .......................... 202310273341.5

(51) Int. Cl.
*G08G 1/16* (2006.01)
*G08G 1/01* (2006.01)
*G01C 21/20* (2006.01)

(52) U.S. Cl.
CPC ........... *G08G 1/167* (2013.01); *G08G 1/0129* (2013.01); *G01C 21/206* (2013.01)

(58) Field of Classification Search
CPC ..... G08G 1/167; G08G 1/0129; G01C 21/206
USPC .......................................................... 701/117
See application file for complete search history.

(56) References Cited

U.S. PATENT DOCUMENTS

| 8,350,724 B2 | 1/2013 | Szczerba et al. |
| 2009/0043462 A1* | 2/2009 | Stratton ................ E02F 9/26 |
| | | 701/50 |
| 2014/0350855 A1 | 11/2014 | Vishnuvajhala |
| 2017/0162050 A1* | 6/2017 | Chen ................ G05D 1/0055 |
| 2021/0192952 A1 | 6/2021 | Silas |

(Continued)

FOREIGN PATENT DOCUMENTS

| DE | 102015000399 A1 | 7/2016 |
| DE | 102015207804 A1 | 11/2016 |

(Continued)

OTHER PUBLICATIONS

United States Patent and Trademark Office. U.S. Appl. No. 18/181,041, filed Mar. 9, 2023.

*Primary Examiner* — Isaac G Smith
(74) *Attorney, Agent, or Firm* — Vivacqua Crane, PLLC (57) ABSTRACT

A method can be used to provide smart notifications to avoid collisions while the vehicle maneuvers in a tight structural environment, such as a home garage or an underground parking lot. The method includes receiving historical vehicle-trajectory data. The historical vehicle-trajectory data includes the location and the heading of the vehicle for each of the plurality of historical trajectories along the structure. The method further includes clustering the plurality of historical trajectories of the vehicle along the structure by types of maneuvers to generate a plurality of trajectory clusters. The method also includes creating a probability distribution bitmap using the plurality of trajectory clusters and creating a topographic map based on the probability distribution bitmap.

20 Claims, 4 Drawing Sheets

(56) References Cited

U.S. PATENT DOCUMENTS

2023/0118743 A1    4/2023   Patel
2023/0168094 A1    6/2023   Beaurepaire et al.

FOREIGN PATENT DOCUMENTS

| DE | 102015212027 A1 | 12/2016 |
| DE | 102016004292 A1 | 2/2017 |
| DE | 102017216237 A1 | 3/2019 |
| DE | 102018211941 A1 | 1/2020 |
| DE | 102021104208 A1 | 9/2021 |
| DE | 102021200115 A1 | 7/2022 |
| DE | 102021116403 A1 | 12/2022 |

\* cited by examiner

SMART NOTIFICATIONS FOR VEHICLE PARKING GARAGE MANEUVERS

The present disclosure relates to systems and methods for providing smart notifications to avoid collisions while the vehicle maneuvers in a parking garage or another tight structural environment.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, vehicles are frequently driven inside parking garages or other tight structural environments. Ideally, the vehicle operators maneuver their vehicles through the parking garages (or other tight structural environment) while avoiding collisions.

SUMMARY

The present disclosure describes a method for providing smart notifications to avoid collisions while the vehicle maneuvers in a parking garage or another tight structural environment. In an aspect of the present disclosure, the method includes receiving historical vehicle-trajectory data. The historical vehicle-trajectory data is indicative of a plurality of historical trajectories of a vehicle along a structure. Each of the plurality of historical trajectories avoids stationary objects in the structure. The historical vehicle-trajectory data includes the location and the heading of the vehicle for each of the plurality of historical trajectories along the structure. The method further includes clustering the plurality of historical trajectories of the vehicle along the structure by types of maneuvers to generate a plurality of trajectory clusters. The method also includes creating a probability distribution bitmap using the plurality of trajectory clusters. The probability distribution bitmap is representative of the plurality of historical trajectories along the structure. The method includes creating a topographic map based on the probability distribution bitmap. The topographic map includes a notification zone and a no-notification zone. The no-notification zone has a first probability density. The notification zone has a second probability density. The first probability density is greater than the second probability density. The second probability density is equal to or less than a predetermined threshold. The first probability density is greater than the predetermined threshold. The method includes receiving, in real time, sensor data from a plurality of sensors of the vehicle and predicting a future trajectory of the vehicle using the sensor data. Also, the method includes determining whether the future trajectory of the vehicle inside the structure crosses into the notification zone of the topographic map and, in response to determining that the future trajectory of the vehicle crosses into the notification zone of the topographic map, generating a notification indicative that the vehicle will cross into the notification zone. The method described in this paragraph improves vehicle technology by creating a topographic map that can be used to provide notifications to a vehicle occupant in order to avoid collisions with stationary objects inside a structure.

In an aspect of the present disclosure, the types of maneuvers include moving straight, moving along a curve to make a left turn, moving along a curve to make a right turn. The method may further include applying a Kernel Density Estimation (KDE) to the plurality of trajectory clusters to create the probability distribution bitmap.

In an aspect of the present disclosure, the notification may be a visual notification including an arrow and a vehicle icon superimposed over the arrow. The arrow of the visual notification is a steering suggestion to prevent the vehicle from entering the notification zone.

In an aspect of the present disclosure, the visual notification may include a steering wheel icon and an arrow over the steering wheel icon, wherein the arrow is a steering suggestion to prevent the vehicle from entering the notification zone.

In an aspect of the present disclosure, the sensor data includes the current position of the vehicle and a steering wheel angle of the vehicle. The future trajectory of the vehicle is predicted using at least the current position of the vehicle and the steering wheel angle of the vehicle.

The present disclosure also describes a tangible, non-transitory, machine-readable medium, including machine-readable instructions, that when executed by one or more processors, cause one or more processors to execute the methods described above.

The present disclosure also describes a system including a plurality of sensors and a controller in communication with the sensor. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
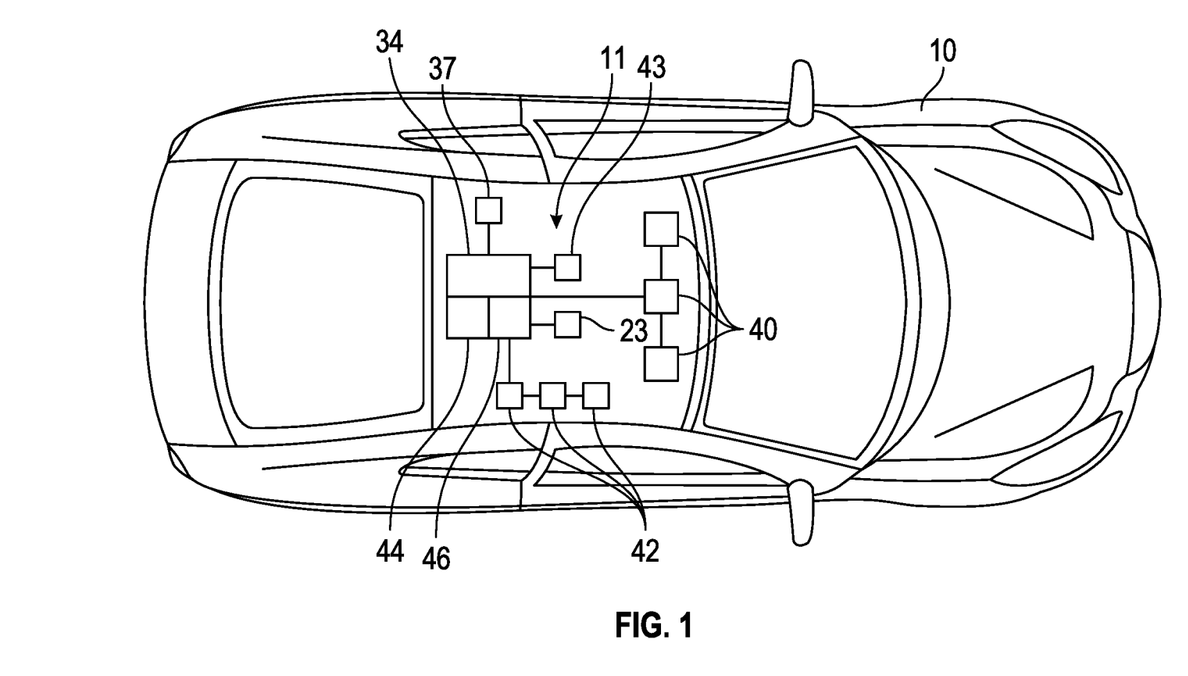
FIG. 1 is a schematic top view of a vehicle including a system for providing smart notifications to avoid collisions while the vehicle maneuvers in a parking garage or another tight structural environment.

With reference to FIG. 1, a vehicle 10 includes (or is in communication with) a system 11 for providing smart notifications to avoid collisions in a parking garage. As non-limiting examples, a notification includes visual notification, audible notification, haptic notification, etc. While the system 11 is shown inside the vehicle 10, it is contemplated that the system 11 may be outside of the vehicle 10. As a non-limiting example, the system 11 may be in wireless communication with the vehicle 10. Although the vehicle 10 is shown as a sedan, it is envisioned that that vehicle 10 may be another type of vehicle, such as a pickup truck, a coupe, a sport utility vehicle (SUVs), a recreational vehicle (RVs), etc.

The vehicle 10 includes a head-up display (HUD) 43 in communication with the controller 34. The HUD 43 is in communication with the controller 34. Accordingly, the HUD 43 may receive commands from the controller 34. During use, the HUD 43 is configured to generate and display one or more graphic indicative of an ideal parking location inside the garage.

The vehicle 10 includes a controller 34 and one or more sensors 40 in communication with the controller 34. The sensors 40 collect information and generate sensor data indicative of the collected information. As non-limiting examples, the sensors 40 may include Global Navigation Satellite System (GNSS) transceivers or receivers, yaw rate sensors, speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ultrasonic sensor may detect static and/or dynamic objects. At least one of the sensors 40 is configured to determine the current location of the vehicle 10. As non-limiting examples, this sensor 40 may be a vehicle location sensor, such as a GPS tracker.

The controller 34 is in communication with the sensors 40. Accordingly, the controller 34 is programmed to receive sensor data from the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators 42 to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 3), that when executed by the one or more processors, cause the processors 44 to execute the method 100 (FIG. 3) and/or method 200 (FIG. 4).

The vehicle 10 includes a user interface 23 in communication with the controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification to the vehicle user of the vehicle 10. The user interface 23 is in electronic communication with the controller 34 and is configured to receive inputs from a vehicle user (e.g., a vehicle driver or a vehicle passenger). For example, the user interface 23 may include a touch screen and/or buttons configured to receive inputs from a vehicle user. Accordingly, the controller 34 is configured to receive inputs from the vehicle user via the user interface 23 and to provide an output (i.e., an alert) to the vehicle user.

The vehicle 10 may include one or more communication transceivers 37 in communication with the controller 34. Each of the communication transceivers 37 is configured to wirelessly communicate information to and from other remote entities, such as the remote vehicles, (through "V2V" communication), infrastructure (through "V2I" communication), remote systems at a remote call center (e.g., ON-STAR by GENERAL MOTORS), and/or personal electronic devices, such as a smart phone. The communication transceivers 37 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the vehicle 10.

The vehicle 10 includes one or more actuators 42 in communication with the controller 34. The actuators 42 control one or more vehicle features such as, but not limited to, a fuel injection system, one or more cam phasers, spark plugs, and a camshaft. The vehicle features may further include interior and/or exterior vehicle features such as, but are not limited to, doors, a trunk, and cabin features such as air, music, lighting, etc.

Figure 2:
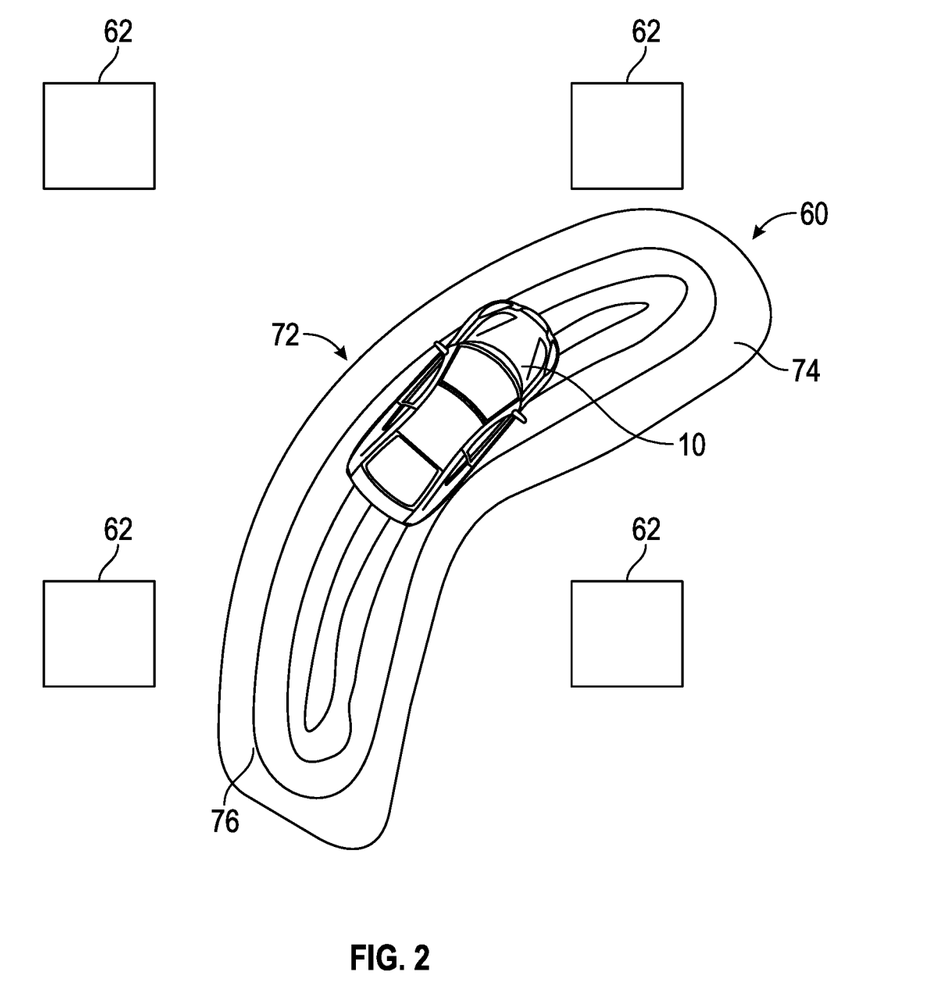
FIG. 2 is a schematic representation of a probability distribution of the vehicle maneuvers in the tight structural environment.

With reference to FIGS. 1 and 2, the system 11 is configured to provide smart notifications to avoid collisions in a tight structural environment 60, such as a home garage or an underground parking lot. In the depicted embodiment, the tight structural environment includes one or more stationary structural objects 62. As non-limiting examples, the stationary structural objects 62 may be pillars (e.g., concrete pillars), walls, panels, columns, dividers, storage containers, and pay stations. The vehicle 10 should maneuver within the tight structural environment 60 while avoiding the stationary structural objects 62. The controller 34 may receive sensor data from the sensors 40 to determine the current location and trajectory of the vehicle 10 inside tight structural environment 60. The information relating to the trajectory of the vehicle inside the tight structural environment may be referred to as the vehicle-trajectory data. Therefore, the vehicle-trajectory data is indicative of the trajectories of the vehicle 10 (or other remote vehicles) along the tight structural environment. These trajectories avoid the structural stationary objects 62 in the tight structural environment. The vehicle-trajectory data includes at least the location and the heading of the vehicle for each trajectory along the tight structural environment.

While moving inside the tight structural environment 60, the vehicle 10 may collide with the stationary structural objects 62. It is therefore desirable to avoid such collisions. Some collision sensors, such as ultrasonic sensors and/or short-range radar, may not be capable of performing effectively in tight environments, such as the tight structural environment 60. Further, some approaches that are dependent on prior mapping of tight structural environment 60 (e.g., parking garages) may be too costly. It therefore desirable to develop a system 11 that provides a notification to a vehicle occupant before a collision occurs without relying on real-time data from sensors 40 and/or mapping of tight structural environment 60. As discussed below, the system 11 employs a learning process to learn the trajectories of the vehicle 10 (or other vehicles) moving through the tight structural environment 60 (i.e., the historical vehicle-trajectory data). The system 11 then uses a probability distribution model that represents the proper trajectories based on the historical vehicle-trajectory data. In addition, the system 11 identifies one or more notification zones inside tight structural environment 60. The notification zone is an area inside the tight structural environment 60 where the vehicle 10 has not been frequently positioned in the past and may be determined using the historical vehicle-trajectory data.

Figure 3:
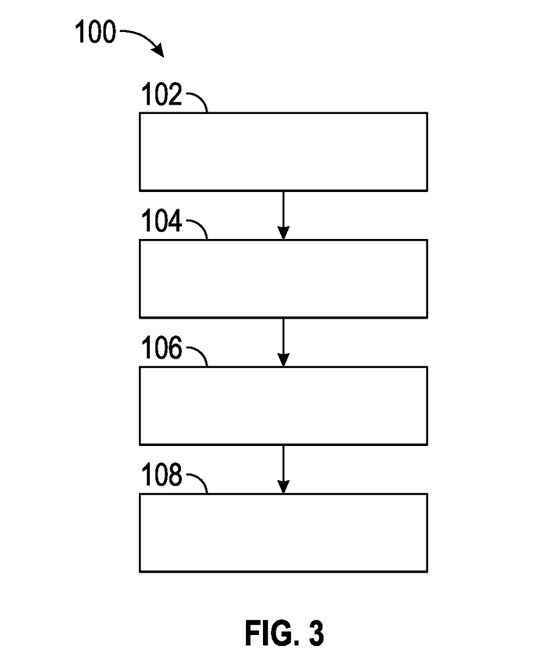
FIG. 3 is a flowchart of a method for providing smart notifications to avoid collisions while the vehicle maneuvers in a parking garage or another tight structural environment.
Figure 4:
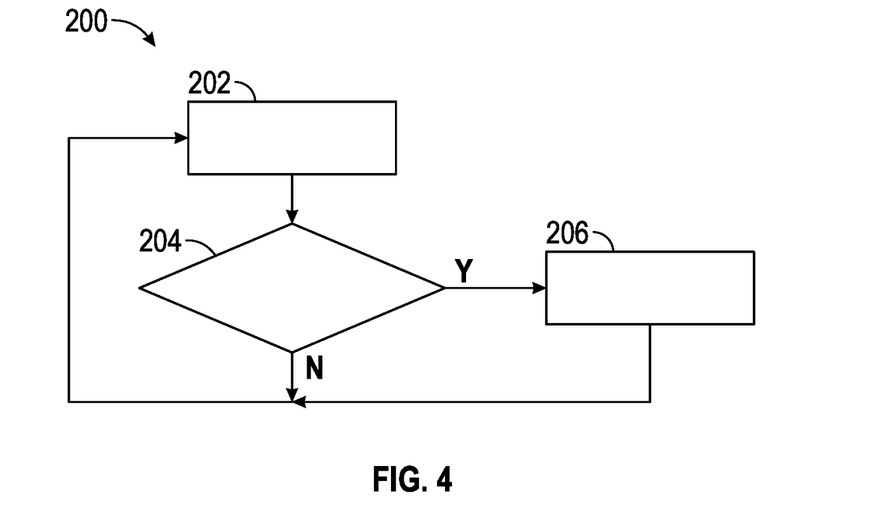
FIG. 4 is a flowchart of a process for providing smart notification.

With reference to FIGS. 2 and 3, FIG. 3 is a flowchart of a method 100 for creating a statistical representation of where the vehicle 10 has been historically positioned while maneuvering through the tight structural environment 60. The vehicle 10 is likely to collide with the stationary objects 62 (e.g., concrete pillars) of the tight structural environment 60 when the vehicle 10 moves through a notification zone 74. On the other hand, it is unlikely that the vehicle 10 will collide with the stationary structural objects 62 (e.g., concrete pillars) when the vehicle 10 moves within the no-notification zone 74. As shown in FIG. 2, the notification zone 76 may entirely surround the no-notification zone to minimize the likelihood that the vehicle 10 will collide with one or more stationary structural objects 62 in the tight structural environment 60.

With continued reference to FIGS. 2 and 3, the method 100 begins at block 102. At block 102, the system 11 tracks and saves (e.g., records) the trajectories of the vehicle 10 (or other vehicles) while moving inside the tight structural environment 60 in the past. To do so, the vehicle 10 may track, in real time, its location inside the tight structural environment 60 using the sensors 40 and precise positioning processes, such as a simultaneous localization and mapping (SLAM). All the trajectories inside the tight structural environment 60 over a predetermined number of days (e.g., 30 days) are saved in the system 11. Thus, at block 102, the controller 34 receives and saves the historical parked-vehicle data over a predetermined number of days (e.g., 30 days). The historical vehicle-trajectory data is indicative of the trajectories of the vehicle 10 (or other vehicles) moving through the tight structural environment 60. Each of the historical trajectories avoids structural stationary objects 62 in the tight structural environment 60. The tight structural environment 60 may be referred to as the structure. The vehicle-trajectory data includes the location and the heading of the vehicle 10 for each of the historical trajectories along the tight structural environment 60 and may be crowd-sourced from different remote vehicles. Next, the method 100 proceeds to block 104.

At block 104, the controller 34 clusters the recorded historical trajectories inside the tight structural environment 60 over the predetermined number of days (e.g., 30 days) to generate one or more trajectory clusters categorized by type of maneuvers. In other words, the trajectories are clustered based on the type of maneuver. The types of maneuvers include, but are not limited to, moving straight, moving along a curve to make a left turn, moving along a curve to make a right turn, etc. Then, the method 100 continues to block 106.

At block 106, the controller 34 creates a probability distribution bitmap for each cluster. As a non-limiting example, the controller 34 applies a Kernel Density Estimation (KDE) to the cluster to generate the probability distribution bitmap. The probability distribution bitmap represents how frequently the vehicle 10 moves along the previously recorded historical trajectories over the predetermined number of days (e.g., past 30 days). Next, the method 100 continues to block 108.

At block 108, the controller 34 converts the probability distribution bitmap into a topographic map 72. The topographic map 72 contains several layers (e.g., zones). For example, the topographic map 72 includes a no-notification zone 76 with high probability density and a notification zone 74 with a probability density lower than a predetermined threshold. Thus, the no-notification zone 76 has a first probability density, and the notification 74 has a second probability density. The first probability density of the no-notification zone 76 is greater than the second probability density of the notification zone 74. The second probability density is equal to or less than a predetermined threshold, and the first probability density is greater than the predetermined threshold. Then, the topographic map 72 is loaded onto the vehicle 10 for real-time notifications.

FIG. 4 is a flowchart of a method 200 for determining when to provide the notifications to the vehicle occupant. The method 200 begins at block 202. At block 202, the controller 34 receives, in real time, sensor data (e.g., current position, heading, steering wheel angle, speed) from the sensors 40 of the vehicle 10 while the vehicle 10 moves through the tight structural environment 60. Next, the controller 34 predicts a future trajectory of the vehicle 10 using the sensor data. Then, the method 200 continues to block 204.

At block 204, the controller 34 then determines whether the future trajectory of the vehicle 10 inside the tight structural environment 60 will cross into the notification zone 74 of the topographic map 72 based, at least in part on, on the current position of the vehicle 10. If the future trajectory of the vehicle 10 inside the tight structural environment 60 will not cross into the notification zone 74 of the topographic map 72, then the method 200 returns to block 202. If the future trajectory of the vehicle 10 inside the tight structural environment 60 crosses into the notification zone 74 of the topographic map 72, then the method 200 proceeds to block 206.

At block 206, the controller 34 generates a notification indicative that the vehicle 10 will cross into the notification zone 74. The vehicle 10 will likely collide with one or more of the stationary structural objects 62 if it travels into the notification zone 74. The notification may be, for example, an audible and/or visual notification generated through the user interface 23 and/or the HUD 43. The notification may include one or more alerts, such as "watch left clearance," "move straight," "steer right", etc.

Figure 5:
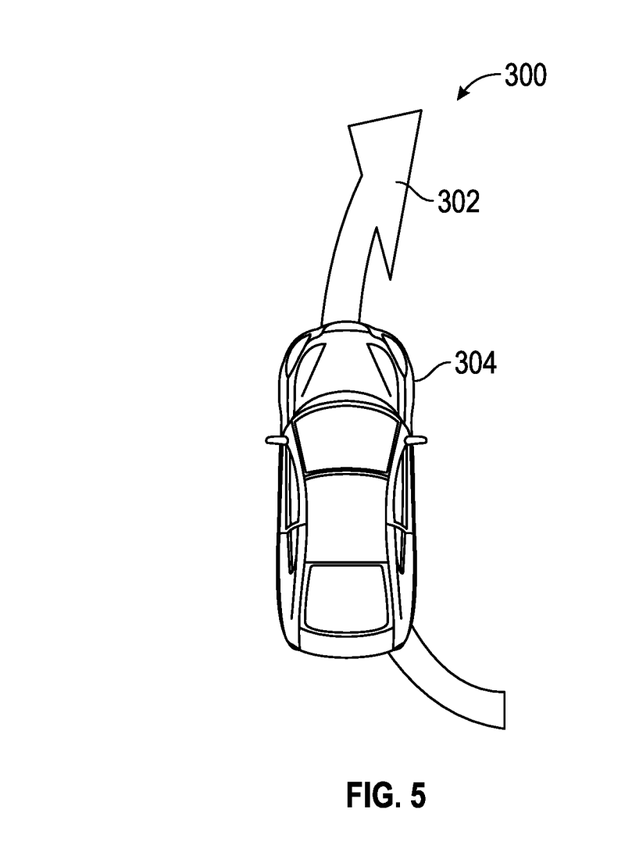
FIG. 5 is a schematic illustration of a visualization of steering suggestions.

With reference to FIG. 5, the system 11 is configured to generate a visual notification 300 through the user interface 23 and/or the HUD 43. The visual notification 400 is derived from the past trajectory statistics together with the current position of the vehicle 10. Further, the visual notification 300 can be used to guide the vehicle occupant (e.g., vehicle driver) through steering and/or longitudinal movement suggestions.

With continued reference to FIG. 5, the system 11 considers both the vehicle occupant's availability for attention and the significance of the information related to steering or longitudinal movement to determine if (and how) the respective information should be displayed. For example, if the vehicle 10 is stationary or moving at a slow speed, both information related to steering and longitudinal movement may be persistently displayed. Otherwise, no information is displayed, or some of the information is displayed (with flashing for better attention attracting). For example, the steering information may be deemed more important than the longitudinal movement information and, therefore, only the steering information is displayed. When the vehicle 10 does not have that much space and/or time to change its trajectory (e.g., closely adjacent vehicles at both front and rear), an intuitive icon (instead of the visual notification 300) may be displayed. When the vehicle 10 has significant amounts of time and/or space to change its trajectory, a text message may be displayed instead of the visual notification 300.

With continued reference to FIG. 5, the visual notification 300 may include a curved or straight arrow 302 and a vehicle icon 304 superimposed over the arrow 302. The size and position of the arrow 302 are derived from statistics relating to the historical trajectories of the vehicle 10 (or other vehicles) along the structural environment 60 along with the current position (including steering wheel angle) of the vehicle 10. The arrow 302 may change colors based on the configuration established by the vehicle occupant to enhance intelligibility. The approximate locations of the entrance, exit, and/or parking spots inside the structural environment 60 may be visualized together if inferable.

Figure 6:
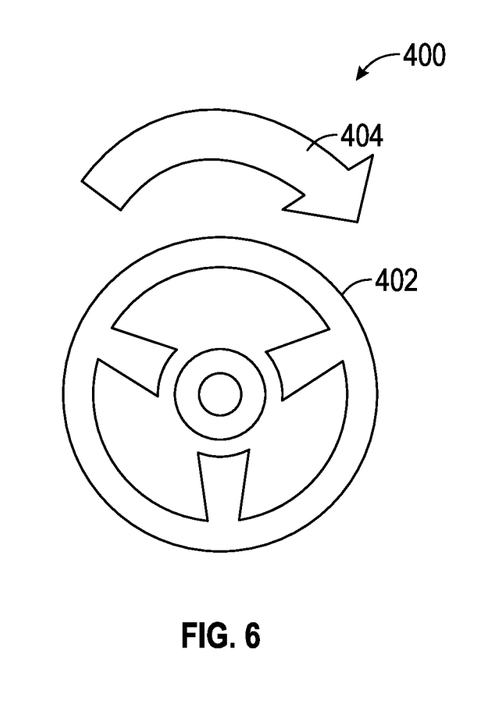
FIG. 6 is a schematic illustration of another visualization of steering suggestions.

With reference to FIG. 6, the system 11 may be configured to display another visual notification 400. The visual notification 400 is a steering suggestion and may include a steering wheel icon 402 and an arrow 404. The arrow is curved or straight and may be positioned above the steering wheel icon 402. The length and direction of the arrow 404 serve as an indication of the desired turning angle for the vehicle 10 to face the most viable moving direction. The arrow 404 may change color. The color change of the arrow 404 may be configured by the vehicle occupant to enhance intelligibility.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for generating notifications, comprising:
   receiving historical vehicle-trajectory data, wherein the historical vehicle-trajectory data is indicative of a plurality of historical trajectories of a vehicle along a structure, each of the plurality of historical trajectories avoids stationary objects in the structure, and the historical vehicle-trajectory data includes a location and a heading of the vehicle for each of the plurality of historical trajectories along the structure;
   clustering the plurality of historical trajectories of the vehicle along the structure by types of maneuvers to generate a plurality of trajectory clusters;
   creating a probability distribution bitmap using the plurality of trajectory clusters, wherein the probability distribution bitmap is representative of the plurality of historical trajectories along the structure;
   creating a topographic map based on the probability distribution bitmap, wherein the topographic map includes a notification zone and a no-notification zone, the no-notification zone has a first probability density, the notification zone has a second probability density, the first probability density is greater than the second probability density, the second probability density is equal to or less than a predetermined threshold, and the first probability density is greater than the predetermined threshold;
   receiving, in real time, sensor data from a plurality of sensors of the vehicle;
   predicting a future trajectory of the vehicle using the sensor data;
   determining whether the future trajectory of the vehicle inside the structure crosses into the notification zone of the topographic map; and
   in response to determining that the future trajectory of the vehicle crosses into the notification zone of the topographic map, generating a notification indicative that the vehicle will cross into the notification zone.

2. The method of claim 1, wherein the types of maneuvers include moving straight, moving along a curve to make a left turn, moving along a curve to make a right turn.

3. The method of claim 2, further comprising applying a Kernel Density Estimation (KDE) to the plurality of trajectory clusters to create the probability distribution bitmap.

4. The method of claim 3, wherein the notification is a visual notification, and the visual notification includes an arrow and a vehicle icon superimposed over the arrow.

5. The method of claim 4, wherein the arrow of the visual notification is a steering suggestion to prevent the vehicle from entering the notification zone.

6. The method of claim 3, wherein the notification is a visual notification, the visual notification includes a steering wheel icon and an arrow over the steering wheel icon, and the arrow is a steering suggestion to prevent the vehicle from entering the notification zone.

7. The method of claim 4, wherein the sensor data includes a current position of the vehicle and a steering wheel angle of the vehicle, and the future trajectory of the vehicle is predicted using at least the current position of the vehicle and the steering wheel angle of the vehicle.

8. A tangible, non-transitory, machine-readable medium, comprising machine-readable instructions, that when executed by a processor, cause the processor to:
   receive historical vehicle-trajectory data, wherein the historical vehicle-trajectory data is indicative of a plurality of historical trajectories of a vehicle along a structure, each of the plurality of historical trajectories avoids stationary objects in the structure, and the historical vehicle-trajectory data includes a location and a heading of the vehicle for each of the plurality of historical trajectories along the structure;
   cluster the plurality of historical trajectories of the vehicle along the structure by types of maneuvers to generate a plurality of trajectory clusters;
   create a probability distribution bitmap using the plurality of trajectory clusters, wherein the probability distribution bitmap is representative of the plurality of historical trajectories along the structure;
   create a topographic map based on the probability distribution bitmap, wherein the topographic map includes a notification zone and a no-notification zone, the no-notification zone has a first probability density, the notification zone has a second probability density, the first probability density is greater than the second probability density, the second probability density is equal to or less than a predetermined threshold, and the first probability density is greater than the predetermined threshold;
   receive, in real time, sensor data from a plurality of sensors of the vehicle;
   predict a future trajectory of the vehicle using the sensor data;
   determine whether the future trajectory of the vehicle inside the structure crosses into the notification zone of the topographic map; and
   in response to determining that the future trajectory of the vehicle crosses into the notification zone of the topographic map, generate a notification indicative that the vehicle will cross into the notification zone.

9. The tangible, non-transitory, machine-readable medium of claim 8, wherein the types of maneuvers include moving straight, moving along a curve to make a left turn, moving along a curve to make a right turn.

10. The tangible, non-transitory, machine-readable medium of claim 9, wherein the tangible, non-transitory, machine-readable medium, further comprising machine-readable instructions, that when executed by the processor, causes the processor to apply a Kernel Density Estimation (KDE) to the plurality of trajectory clusters to create the probability distribution bitmap.

11. The tangible, non-transitory, machine-readable medium of claim 10, wherein the notification is a visual notification, and the visual notification includes an arrow and a vehicle icon superimposed over the arrow.

12. The tangible, non-transitory, machine-readable medium of claim 11, wherein the arrow of the visual notification is a steering suggestion to prevent the vehicle from entering the notification zone.

13. The tangible, non-transitory, machine-readable medium of claim 10, wherein the notification is a visual notification, the visual notification includes a steering wheel icon and an arrow over the steering wheel icon, and the arrow is a steering suggestion to prevent the vehicle from entering the notification zone.

14. The tangible, non-transitory, machine-readable medium of claim 13, wherein the sensor data includes a current position of the vehicle and a steering wheel angle of the vehicle, and the future trajectory of the vehicle is predicted using at least the current position of the vehicle and the steering wheel angle of the vehicle.

15. A system, comprising:
a plurality of sensors;
a controller in communication with the plurality of sensors, wherein the controller is programmed to:
receive historical vehicle-trajectory data, wherein the historical vehicle-trajectory data is indicative of a plurality of historical trajectories of a vehicle along a structure, each of the plurality of historical trajectories avoids stationary objects in the structure, and the historical vehicle-trajectory data includes a location and a heading of the vehicle for each of the plurality of historical trajectories along the structure;
cluster the plurality of historical trajectories of the vehicle along the structure by types of maneuvers to generate a plurality of trajectory clusters;
create a probability distribution bitmap using the plurality of trajectory clusters, wherein the probability distribution bitmap is representative of the plurality of historical trajectories along the structure;
create a topographic map based on the probability distribution bitmap, wherein the topographic map includes a notification zone and a no-notification zone, the no-notification zone has a first probability density, the notification zone has a second probability density, the first probability density is greater than the second probability density, the second probability density is equal to or less than a predetermined threshold, and the first probability density is greater than the predetermined threshold;
receive, in real time, sensor data from the plurality of sensors of the vehicle;
predict a future trajectory of the vehicle using the sensor data;
determine whether the future trajectory of the vehicle inside the structure crosses into the notification zone of the topographic map; and
in response to determining that the future trajectory of the vehicle crosses into the notification zone of the topographic map, generate a notification indicative that the vehicle will cross into the notification zone.

16. The system of claim 15, wherein the types of maneuvers include moving straight, moving along a curve to make a left turn, moving along a curve to make a right turn.

17. The system of claim 15, wherein the controller is programmed to apply a Kernel Density Estimation (KDE) to the plurality of trajectory clusters to create the probability distribution bitmap.

18. The system of claim 16, wherein the notification is a visual notification, the visual notification includes an arrow and a vehicle icon superimposed over the arrow, and the arrow of the visual notification is a steering suggestion to prevent the vehicle from entering the notification zone.

19. The system of claim 17, wherein the notification is a visual notification, the visual notification includes a steering wheel icon and an arrow over the steering wheel icon, and the arrow is a steering suggestion to prevent the vehicle from entering the notification zone.

20. The system of claim 19, wherein the sensor data includes a current position of the vehicle and a steering wheel angle of the vehicle, and the future trajectory of the vehicle is predicted using at least the current position of the vehicle and the steering wheel angle of the vehicle.

\* \* \* \* \*